(12) United States Patent
Delaney et al.

(10) Patent No.: US 10,917,257 B2
(45) Date of Patent: Feb. 9, 2021

(54) INTERNET OF THINGS ENABLED DEVICE TERMINATION

(71) Applicant: INTERNATIONAL BUSINESS MACHINES CORPORATION, Armonk, NY (US)

(72) Inventors: Mark P. Delaney, Raleigh, NC (US); Robert H. Grant, Atlanta, GA (US); Charlotte J. Hutchinson, Reigate (GB)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/192,545

(22) Filed: Nov. 15, 2018

(65) Prior Publication Data
US 2020/0162278 A1    May 21, 2020

(51) Int. Cl.
| | |
|---|---|
| *H04L 12/28* | (2006.01) |
| *H04W 52/02* | (2009.01) |
| *H04W 4/80* | (2018.01) |
| *H04W 8/00* | (2009.01) |

(52) U.S. Cl.
CPC ...... *H04L 12/2816* (2013.01); *H04L 12/2809* (2013.01); *H04W 4/80* (2018.02); *H04W 8/005* (2013.01); *H04W 52/0219* (2013.01)

(58) Field of Classification Search
None
See application file for complete search history.

(56) References Cited

U.S. PATENT DOCUMENTS

| | | | |
|---|---|---|---|
| 9,395,792 B1 | 7/2016 | Kahn et al. | |
| 9,774,507 B2 | 9/2017 | Britt et al. | |
| 9,800,718 B2 | 10/2017 | Kuang | |
| 2003/0158609 A1* | 8/2003 | Chiu | H04W 52/0274 |
| | | | 700/22 |

(Continued)

FOREIGN PATENT DOCUMENTS

| | | |
|---|---|---|
| CN | 106657398 A | 5/2017 |
| WO | 2016187298 A1 | 11/2016 |

OTHER PUBLICATIONS

Belle, "Flow Does Your Fitness Tracker Know When You're Asleep," Exist Blog, Feb. 17, 2014, p. 1-4, https://exist.io/blog/fitness-tracker-sleep/, Accessed on Nov. 13, 2018.

(Continued)

*Primary Examiner* — Carlos R Ortiz Rodriguez
(74) *Attorney, Agent, or Firm* — Jordan T. Schiller

(57) ABSTRACT

A computer-implemented method for controlling one or more devices within a network. The method detects that the one or more devices, within the network associated with a user, are in-use. The method further detects that the user is in an inactive state, and obtains a plurality of information associated with a plurality of factors for the detected one or more devices. The method further controls the one or more devices within the network associated with the user based on the detected inactive state of the user and the obtained plurality of information. The method further assigns a score for each of the plurality of factors for the one or more devices, aggregates the assigned scores for each of the plurality of factors for the one or more devices, and deactivates the one or more devices within the network of the user based on the aggregated score exceeding a threshold value.

17 Claims, 6 Drawing Sheets

(56) References Cited

U.S. PATENT DOCUMENTS

| | | | | |
|---|---|---|---|---|
| 2010/0035656 | A1* | 2/2010 | Pan | G06F 1/1684 455/566 |
| 2014/0006823 | A1 | 1/2014 | Lamb | |
| 2015/0019342 | A1 | 1/2015 | Gupta | |
| 2015/0185713 | A1 | 7/2015 | Glickfield et al. | |
| 2016/0195859 | A1 | 7/2016 | Britt et al. | |
| 2016/0235359 | A1 | 8/2016 | Cho et al. | |
| 2017/0318421 | A1 | 11/2017 | Kim et al. | |
| 2018/0035370 | A1 | 2/2018 | Chaturvedi et al. | |
| 2018/0049638 | A1 | 2/2018 | Ewers et al. | |

OTHER PUBLICATIONS

Brown, "How Much Power Are Your Appliances Actually Consuming?," Kompulsa, p. 1-6, https://www.kompulsa.com/how-much-power-are-your-appliances-consuming/, Accessed on Nov. 13, 2018.

Fitbit, "How do I Track my Sleep with my Fitbit Device?," Fitbit Help, Last Updated Nov. 7, 2018, p. 1-4, https://help.fitbit.com/articles/en_US/Help_article/1314, Accessed on Nov. 13, 2018.

Hollister, "This Wearable Pauses Live TV If You Fall Asleep," Gizmodo, Dec. 22, 2014, p. 1, https://gizmodo.com/this-wearable-pauses-live-tv-if-you-fall-asleep-1674271072, Accessed on Nov. 13, 2018.

Langley, "Counting Sheep: The Best Sleep Trackers and Monitors," Wareable Health and Wellbeing Feature, Oct. 8, 2018, p. 1-5, Wareable Ltd., https://www.wareable.com/health-and-wellbeing/best-sleep-trackers-and-monitors, Accessed on Nov. 13, 2018.

Lewis, "Keeping the Internet of Things Secure with Watson IoT Platform," IBM IoT Blog, Feb. 9, 2017, p. 1-2, https://www.ibm.com/blogs/internet-of-things/security/, Accessed on Nov. 13, 2018.

Liljegren, "What are the Most Dangerous Appliances in Your Home?," Liljegren Law Group, p. 1-3, https://www.liljegrenlaw.com/what-are-the-most-dangerous-appliances-in-your-home/, Accessed on Nov. 13, 2018.

McAlone, "Nefflix has Created 'Smart' Socks that Sense when you Fall Asleep and Pause the Show you're Watching," Business Insider, Dec. 16, 2015, p. 1-6, https://www.businessinsider.com/netflix-socks-turn-off-the-show-when-you-fall-asleep-2015-12, Accessed on Nov. 13, 2018.

Mell et al., "The NIST Definition of Cloud Computing," National Institute of Standards and Technology, Sep. 2011, p. 1-3, Special Publication 800-145.

Sjøberg, "Sleep Easier with a Baby-Movement Monitor Built on Watson IoT," IBM Cloud Computing Blog, Jul. 6, 2017, p. 1-3, https://www.ibm.com/blogs/cloud-computing/2017/07/06/baby-movement-app-watson/, Accessed on Nov. 13, 2018.

Walsh, "IBM and Apple Team Up for IoT-Based Sleep Study," RTInsights, Mar. 4, 2016, p. 1-2, https://www.rtinsights.com/ibm-and-apple-team-up-for-iot-based-sleep-study/, Accessed on Nov. 13, 2018.

* cited by examiner

Time of Reading: 10:03PM

User Threshold for Device Turn Off: 70%

| Device | Use Status | Meta Data from Current Use | Time Since Last Interaction with Device | Energy Consumption Factor | Potential Harm of Device | Total Rating | Turn off Device Based on Threshold? |
|---|---|---|---|---|---|---|---|
| Oven | In Use | 450 Degrees | 0.60 | 0.95 | 0.95 | 83% | Yes |
| Television | In Use | Basketball Game, 4th Quarter, Tied Score | 0.80 | 0.60 | 0.60 | 67% | No |
| ... | | | | | | | |
| Stereo | In Use | Volume 16/50, Soft Music | 0.95 | 0.40 | 0.40 | 58% | No |

| Energy Consumption Score | | Time Since Last Interaction Score | | Potential Harm of Device Score | | Output | |
|---|---|---|---|---|---|---|---|
| < 1 Hour | 0.40 | 1-100 KwH | 0.40 | 0-1000 Accidents/Year | 0.40 | Aggregate Score of Factors to Continually Reevaluate Status of Devices Within IoT Mesh Network | |
| 1-2 Hours | 0.60 | 100-1000 KwH | 0.60 | 1000-2000 Accidents/Year | 0.60 | | |
| 2-3 Hours | 0.80 | 1000-2000 KwH | 0.80 | 2000-5000 Accidents/Year | 0.80 | | |
| 3+ Hours | 0.95 | 2000+ KwH | 0.95 | 5000+ Accidents/Year | 0.95 | | |

Time of Reading: 11:03PM

User Threshold for Device Turn Off: 70%

| Device | Use Status | Meta Data from Current Use | Time Since Last Interaction with Device | Energy Consumption Factor | Potential Harm of Device | Total Rating | Turn off Device Based on Threshold? |
|---|---|---|---|---|---|---|---|
| Oven | In Use | 450 Degrees | 0.60 | 0.95 | 0.95 | 83% | Yes |
| Television | In Use | Basketball Game, 4th Quarter, Tied Score | 0.95 | 0.60 | 0.60 | 72% | Yes |
| ... | | | | | | | |
| Stereo | In Use | Volume 16/50, Soft Music | 0.95 | 0.40 | 0.40 | 58% | No |

| Energy Consumption Score | | Time Since Last Interaction Score | | Potential Harm of Device Score | | Output | |
|---|---|---|---|---|---|---|---|
| < 1 Hour | 0.40 | 1-100 KwH | 0.40 | 0-1000 Accidents/Year | 0.40 | Aggregate Score of Factors to Continually Reevaluate Status of Devices Within IoT Mesh Network | |
| 1-2 Hours | 0.60 | 100-1000 KwH | 0.60 | 1000-2000 Accidents/Year | 0.60 | | |
| 2-3 Hours | 0.80 | 1000-2000 KwH | 0.80 | 2000-5000 Accidents/Year | 0.80 | | |
| 3+ Hours | 0.95 | 2000+ KwH | 0.95 | 5000+ Accidents/Year | 0.95 | | |

FIG. 3

INTERNET OF THINGS ENABLED DEVICE TERMINATION

BACKGROUND

The present disclosure relates generally to the field of cognitive computing and more particularly to data processing and dynamic controlling of electronic devices.

Oftentimes, a user falls asleep while their electronic devices, or appliances, are still operating and plugged in. Sometimes this is as harmless as a television or radio left on through the night. Other times, it is much more dire such as leaving an oven or stovetop on through the night.

Current methods of controlling electronic devices utilize manual operation of wearables and time delay methods to turn off electronic devices. Various other methods are focused on awakening a user that has fallen asleep, and not necessarily disabling electronic devices.

BRIEF SUMMARY

Embodiments of the present invention disclose a method, a computer program product, and a system.

A method, according to an embodiment of the invention, in a data processing system including a processor and a memory, for controlling one or more devices within a network. The method includes detecting that the one or more devices, within the network associated with a user, are in-use. The method further includes detecting that the user is in an inactive state, and obtaining a plurality of information associated with a plurality of factors for the detected one or more devices, within the network of the user, that are in-use. The method further includes controlling the one or more devices within the network associated with the user based on the detected inactive state of the user and the obtained plurality of information associated with the plurality of factors for the detected one or more devices, within the network associated with the user, that are in-use.

A computer program product, according to an embodiment of the invention, includes a non-transitory tangible storage device having program code embodied therewith. The program code is executable by a processor of a computer to perform a method. The method includes detecting that the one or more devices, within the network associated with a user, are in-use. The method further includes detecting that the user is in an inactive state, and obtaining a plurality of information associated with a plurality of factors for the detected one or more devices, within the network of the user, that are in-use. The method further includes controlling the one or more devices within the network associated with the user based on the detected inactive state of the user and the obtained plurality of information associated with the plurality of factors for the detected one or more devices, within the network associated with the user, that are in-use.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes detecting that the one or more devices, within the network associated with a user, are in-use. The method further includes detecting that the user is in an inactive state, and obtaining a plurality of information associated with a plurality of factors for the detected one or more devices, within the network of the user, that are in-use. The method further includes controlling the one or more devices within the network associated with the user based on the detected inactive state of the user and the obtained plurality of information associated with the plurality of factors for the detected one or more devices, within the network associated with the user, that are in-use.

BRIEF DESCRIPTION OF THE DRAWINGS

FIG. 3 illustrates a use case of device management program of FIG. 1, in accordance with an embodiment of the present invention.

DETAILED DESCRIPTION

Oftentimes, a user falls asleep while their electronic devices, or appliances, are still operating and plugged in. Sometimes this is as harmless as a television or radio left on through the night. Other times, it is much more dire such as leaving an oven or stovetop on through the night.

Currently, there is no solution that assigns a score to Internet of Things (IoT) devices based on a risk of harm if left on, and ranks the in-use IoT devices, in order of priority of shutting off, when a user falls asleep based on potential harm and energy consumption.

The present invention discloses a method to systematically prioritize one or more devices, or appliances, to turn off within a mesh network based on user sleep patterns, harm of the device being left on, device energy consumption, and the amount of time that the device has been on.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
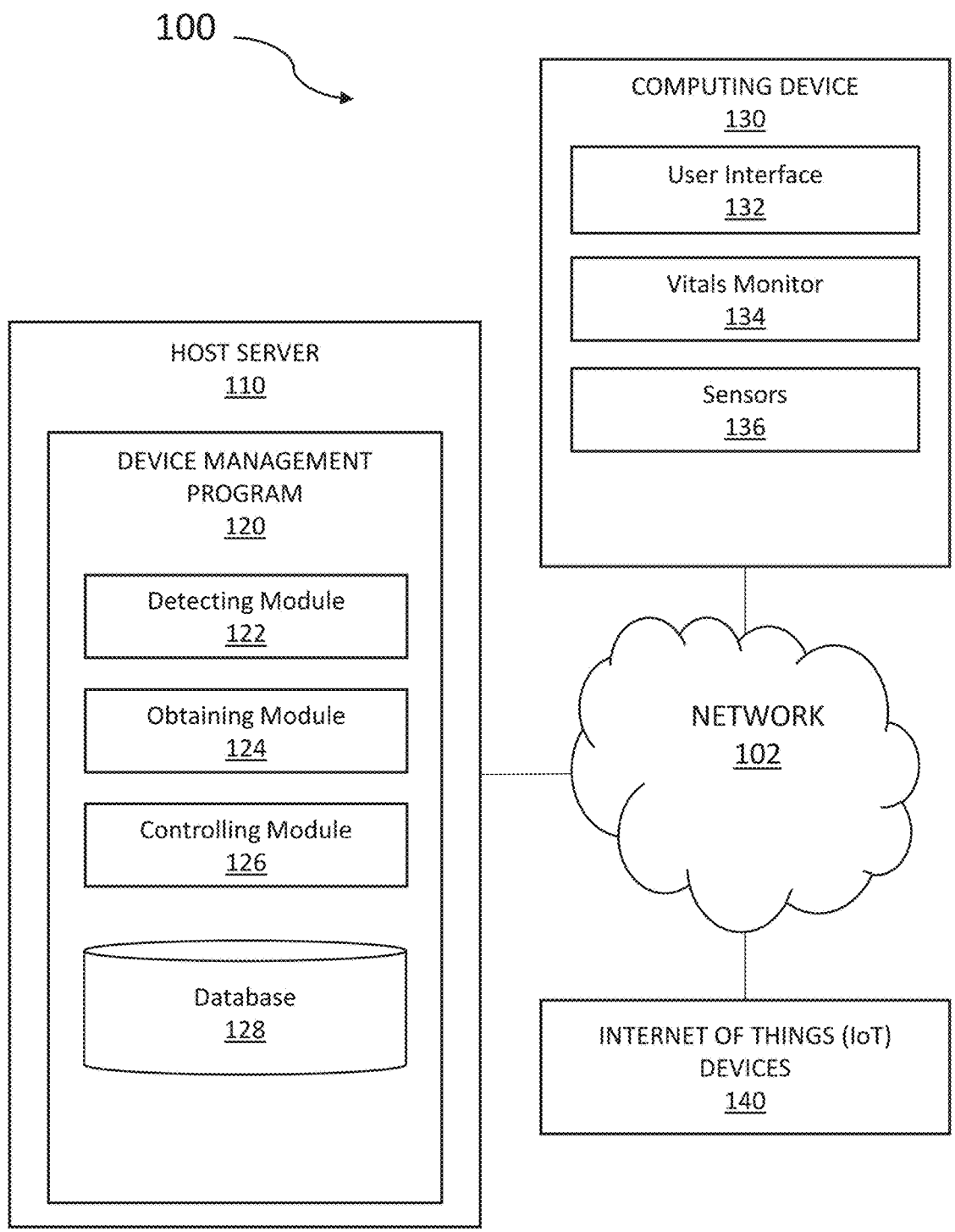
FIG. 1 illustrates a device management computing environment, in accordance with an embodiment of the present invention.

FIG. 1 illustrates device management computing environment 100, in accordance with an embodiment of the present invention. Device management computing environment 100 includes host server 110, computing device 130, and Internet of Things (IoT) devices 140 all connected via network 102. The setup in FIG. 1 represents an example embodiment configuration for the present invention, and is not limited to the depicted setup in order to derive benefit from the present invention.

In the example embodiment, host server 110 contains device management program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with computing device 130 and IoT devices 140 via network 102. Host server 110 may include internal and external hardware components, as depicted and described in further detail below with reference to FIG. 4. In other embodiments, host server 110 may be implemented in a cloud computing environment, as described in relation to FIGS. 5 and 6, herein. Host server 110 may also have wireless connectivity capabilities allowing it to communicate with computing device 130, IoT devices 140, and other computers or servers over network 102.

With continued reference to FIG. 1, computing device 130 contains user interface 132, vitals monitor 134, and sensors 136. In various embodiments, computing device 130 may be a laptop computer, tablet computer, netbook computer, personal computer (PC), a desktop computer, a personal digital assistant (PDA), a wearable device, a smart phone, or any programmable electronic device capable of communicating with host server 110 and IoT devices 140 via network 102. Computing device 130 may include internal and external hardware components, as depicted and described in further detail below with reference to FIG. 4. In other embodiments, computing device 130 may be implemented in a cloud computing environment, as described in relation to FIGS. 5 and 6, herein. Computing device 130 may also have wireless connectivity capabilities allowing it to communicate with host server 110, IoT devices 140, and other computers or servers over network 102.

In exemplary embodiments, computing device 130 includes user interface 132, which may be a computer program that allows a user to interact with computing device 130 and other connected devices via network 102. For example, user interface 132 may be a graphical user interface (GUI). In addition to comprising a computer program, user interface 132 may be connectively coupled to hardware components, such as those depicted in FIG. 4, for receiving user input. In an exemplary embodiment, user interface 132 may be a web browser, however in other embodiments user interface 132 may be a different program capable of receiving user interaction and communicating with other devices.

In exemplary embodiments, computing device 130 includes vitals monitor 134, which may be a computer program, on computing device 130, that detects and monitors a user's vital signs which may include blood pressure, cholesterol levels, blood sugar levels, heart rate and so on. In other embodiments, vitals monitor 134 may be a separate device such as a blood glucose monitor, a heart rate monitor, or a wearable device that detects one or more of a user's vital signs, and communicates with computing device 130. Vitals monitor 134 may be capable of transmitting detected and monitored vital signs of a user to device management program 120, either on a continuous basis or at set intervals. In other embodiments, vitals monitor 134 may be configured to detect and monitor a user's vital signs based on any method known to one of ordinary skill in the art.

In exemplary embodiments, computing device 130 includes sensors 136, which may be an electronic hardware component, module, or subsystem capable of detecting events or changes in a user environment and sending the detection data to other electronics (e.g., a computer processor), components (e.g., database 128), or programs (e.g., device management program 120) within a system such as device management environment 100. In various embodiments, the detection data collected by sensors 136 may be instrumental in determining an activity status of a user (e.g., wide awake, drowsy, asleep) as known to one of ordinary skill in the art. For example, sensors 136 may be capable of detecting and transmitting heart rate information, head tilt, and eye movements of a user, to name a few.

Sensors 136, in an exemplary embodiment, may be located within, or near, computing device 130 and may be a global positioning system (GPS), software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, video camera, digital camera, Internet of Things (IoT) sensors, lasers, gyroscopes, accelerometers, structured light systems, user tracking sensors (e.g., eye, head, hand, and body tracking positions of a user), and other devices used for measuring an environment or current state of the user and/or the physical environment of the user. In the example embodiment, sensors 136 is referenced via network 102.

In exemplary embodiments, the data collected from sensors 136 may be useful in assisting device management program 120 to detect an activity status of a user (e.g., asleep or awake) within the network. In alternative embodiments, device management program computing environment 100 may include any other systems and methods for collecting and utilizing user behavior data within an IoT system, known to one of ordinary skill in the art.

In exemplary embodiments, sensors 136 are capable of continuously monitoring, collecting, and saving collected data on a local storage database, or sending the collected data to device management program 120 for analysis. In alternative embodiments, sensors 136 may be capable of detecting, communicating, pairing, or syncing with IoT devices 140, thus creating opportunities for more direct integration of the physical world into computer-based systems, and resulting in improved efficiency, accuracy, and economic benefit in addition to reduced human intervention.

In exemplary embodiments, IoT devices 140 may include home appliances (e.g., stove, oven, refrigerator, blender, hot plate, toaster, iron), consumer electronics (e.g., television, stereo, computer, alarm system), and any other electronic devices connected to a user computing device, such as computing device 130, via network 102.

In exemplary embodiments, IoT devices 140, together with computing device 130, may all be connected via a wireless mesh network. A wireless mesh network is a communication network, such as network 102, made up of radio nodes organized in a mesh topology. A mesh refers to rich interconnection among devices or nodes. When one node can no longer operate, the rest of the nodes can still communicate with each other, directly or through one or more intermediate nodes. Wireless mesh networks often consist of mesh clients, mesh routers and gateways. In a wireless mesh network, topology tends to be more static, so that routes of computation can converge and delivery of data to their destinations can occur. Mesh clients are often laptops, cell phones, and other wireless devices, such as computing device 130.

In exemplary embodiments, home appliances and consumer electronics of a user, such as IoT devices 140, may be interconnected via an IoT mesh network, all connected to computing device 130.

With continued reference to FIG. 1, device management program 120, in the example embodiment, may be a computer application on host server 110 that contains instruction sets, executable by a processor. The instruction sets may be described using a set of functional modules. In exemplary embodiments, device management program 120 may receive input from computing device 130 and IoT devices 140 over network 102. In alternative embodiments, device management program 120 may be a computer application operated on computing device 130, or as a standalone program on a separate electronic device.

The functional modules of device management program 120 include detecting module 122, obtaining module 124, controlling module 126, and database 128.

Figure 2:
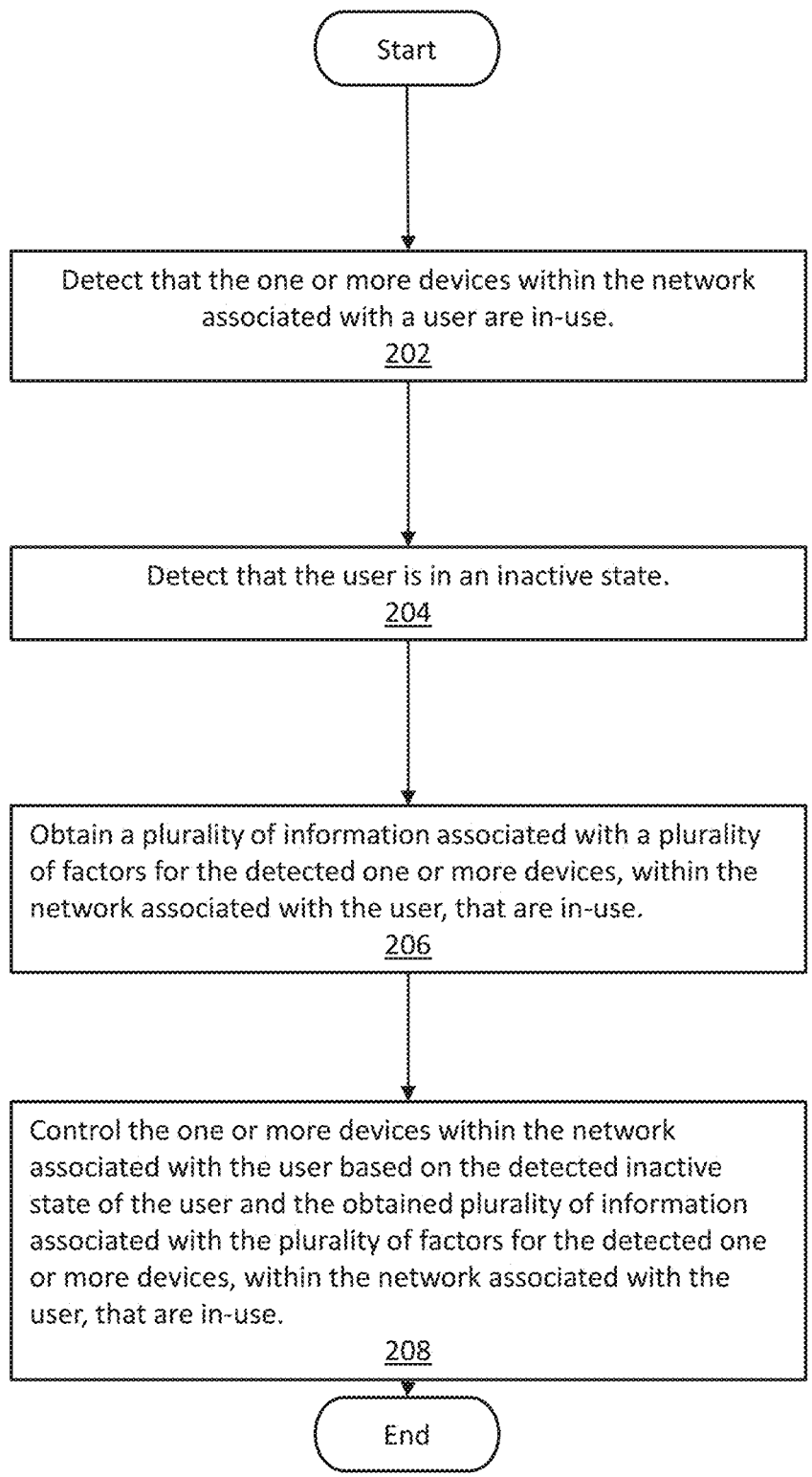
FIG. 2 is a flowchart illustrating the operation of device management program of FIG. 1, in accordance with an embodiment of the present invention.

FIG. 2 is a flowchart illustrating the operation of device management program 120 of FIG. 1, in accordance with embodiments of the present invention.

With reference to FIGS. 1 and 2, detecting module 122 includes a set of programming instructions in device management program 120, to detect that the one or more devices, such as IoT devices 140, within the network associated with a user are in-use (step 202). The set of programming instructions are executable by a processor.

In exemplary embodiments, the network of a user includes an IoT mesh network comprising a user's wearable device, such as computing device 130, that is connected to IoT devices 140.

In exemplary embodiments, detecting module 122 further includes a set of programming instructions in device management program 120, to detect that the user is in an inactive state (step 204). For example, vitals monitor 134 and sensors 136 on computing device 130 may relay collected data about the user to device management program 120.

For example, sensors 136 may capture limb movements, eye movements, breathing patterns, and heart rate of a user to determine whether the user is asleep (i.e., inactive). In alternative embodiments, device management program 120 may be capable of comparing vital signs of a user with historical sensor data of the user for a certain time of day. For example, the user is historically sleeping at 11 pm on a weeknight. If the vital signs of a user indicate that a user is asleep, then the confidence level of an activity status assessment of the user is made with a higher level of confidence, by device management program 120, if the time is 11 pm or later on a weeknight.

In various embodiments, device management program 120 may be capable of quantifying collected data feeds of a user (e.g., collected sensor data over time) as surpassing a threshold value based on standard deviation models. In this fashion, a reference chart that depicts various active states of a user may have associated numerical values (e.g., 1-10 where the greater the number indicates a more active state of the user), and may be cross-referenced with a chart depicting a time of day.

With reference to an illustrative example, Mark is at home watching some late night television. He is wearing his wearable device which is connected to the IoT mesh network in his house. Most of the electronic devices/appliances within Mark's home are connected to his IoT mesh network. Detecting module 122 detects that the following devices in Mark's home are in use: oven, television, and stereo in the bathroom. Mark is beginning to feel sleepy. Based on data received from Mark's vitals monitor 134 and sensors 136, detecting module 122 determines that Mark's breathing rate and heart rate have slowed down, he has not made any limb movements in over 15 minutes, and his eyes have been closed for over fifteen (15) minutes. Based on Mark's historical data showing that he falls asleep while watching late night television, device management program 120 determines that Mark has fallen asleep on the couch while watching television. The oven, the television, and the stereo in the bathroom are still in use.

With continued reference to FIGS. 1 and 2, obtaining module 124 includes a set of programming instructions, in device management program 120, to obtain a plurality of information associated with a plurality of factors for the detected one or more devices, within the network associated with the user, that are in-use (step 206). The set of programming instructions are executable by a processor.

In exemplary embodiments, the plurality of factors comprise: an amount of time since the user last had an interaction with the one or more devices; energy consumption of the one or more devices; potential harm caused by the one or more devices; and the amount of time that the one or more devices have been activated.

In various embodiments, device management program 120 may assign a score for each of the plurality of factors for the one or more devices that are in use, aggregate the assigned scores for each of the plurality of factors for the one or more devices, and deactivate the one or more devices within the network of the user that are in-use based on the aggregated assigned score exceeding a threshold value.

FIG. 3 illustrates a use case of device management program 120 of FIG. 1, in accordance with an embodiment of the present invention.

With reference to FIG. 3 and the illustrative example used above, Mark fell asleep with the oven, the television, and the stereo in use. As depicted in FIG. 3, the continuously monitored devices within the IoT mesh network are updated to reflect meta data from current use. For example, the oven has reached 450 degrees, the basketball game is currently in the 4$^{th}$ quarter with a tied score, and the stereo is currently playing music at a low volume. Obtaining module 124 is capable of ascertaining three factors of specific information about the in-use devices, such as (1) the time since the user's last interaction with device, (2) energy consumption of the device, and (3) potential harm of leaving the device on, and assigning a total numerical score for each device, in real time, based on the continuously aggregated numerical values of the three factors of specific information about the in-use devices. In exemplary embodiments, the numerical score values for each of the three factors are cross-referenced with a reference chart stored in database 128. The present invention is not limited to the three factors of specific information for the in-use devices depicted herein.

In exemplary embodiments, the energy consumption of a device means an amount of energy that the device consumes. The potential harm of leaving a device on is a determination based on reported statistics and manufacturer guidelines. For example, potential harm statistics may be updated regularly and as such, numerical scores assigned to in-use devices may be adjusted based on reported potential harm statistics.

In exemplary embodiments, specific information about the in-use devices may be stored in database 128 and accessed by device management program 120. The specific information about the in-use devices may be updated automatically based on manufacturer updates, recalls, and/or recent reported statistics from consumer agencies and end-users.

For example, as depicted in FIG. 3, detecting module 122 detects that the oven has been on between 1-2 hours and therefore assigns a cross-referenced numerical score of 0.6 based on the span of hours depicted in the reference chart. In this case, the reference chart depicted in FIG. 3 assigns a 0.6 numerical score for a device that has been on between 1-2 hours. In alternative scenarios, the reference chart in FIG. 3 assigns a 0.8 numerical score for a device that has been on between 2-3 hours.

With continued reference to the chart in FIG. 3, the oven has consumed 2000 KwH+ and therefore has a numerical score of 0.95 based on the reference chart; and the potential harm of leaving the oven on while Mark is asleep is assigned a numerical score of 0.95 based on a reported 5000+ accidents per year as a result of leaving the oven on in the home unsupervised. The total aggregate score is 83%, which exceeds the user threshold (70%) for turning off the device. As a result, controlling module 126 turns off the IoT connected oven while Mark is asleep, thereby protecting Mark and his house from possibly critical damages.

In alternative embodiments, controlling module 126 may be capable of adjusting the one or more devices within the network of the user to a lower power mode. In exemplary embodiments, controlling module 126 transmits instructions via network 102 to the IoT device's 140 (e.g., via product ID) internal processor which in turn adjusts the IoT device accordingly. For example, instructions may include temperature control, volume control, power off, and so on.

In various embodiments, device management program 120 may be capable of ranking the one or more devices, within the network of the user, based on the aggregated assigned score, and prioritizing control of the one or more devices based on the ranking.

In exemplary embodiments, obtaining module 124 may continuously monitor the one or more devices within the network of the user, as well as the activity status of the user, and continuously update the information associated with the plurality of factors for the one or more devices within the network of the user.

With continued reference to FIG. 3 and the illustrative example above, obtaining module 124 continually ranks and scores the connected electronic devices in real time based on a plurality of factors, including (a) harm of device being left on; (b) energy consumption of the device; and (c) time the device has been on. At 10:03 pm, after Mark has fallen asleep, device management program 120 determines that only the in-use oven is in critical need to be turned off, based on the aggregate scores of the plurality of factors for the oven. An hour later, at 11:03 pm, device management program 120 determines that enough time has elapsed where Mark has not had any interaction with the television, and as such, controlling module 126 turns off the IoT connected television. The only device still in-use is the bathroom stereo which is on low volume, and does not pose any potential harm or critical energy consumption.

With continued reference to FIGS. 1 and 2, controlling module 126 includes a set of programming instructions in device management program 120, to control the one or more devices within the network associated with the user based on the detected inactive state of the user and the obtained plurality of information associated with the plurality of factors for the detected one or more devices, within the network associated with the user, that are in-use (step 208). The set of programming instructions is executable by a processor.

In alternative embodiments, device management program 120 may be capable of detecting a second user within a network and controlling the one or more devices within the network based on determining that the user and the second user within the network are inactive (e.g., asleep). For example, device management program 120 may query network 102 to obtain a list of user devices (e.g., personal computing devices, wearables, medical devices, etc.). In various embodiments, users may be capable of opting-in, or out, of the network connected to device management program 120.

With continued reference to FIG. 3 and the illustrative example above, controlling module 126 deactivates, or powers off, the one or more devices within Mark's home IoT mesh network in order to save energy consumption and avoid critically dangerous incidents, based on the aggregated score of the one or more devices compared to a respective threshold value.

In exemplary embodiments, device management program 120 may be capable of receiving user feedback, in response to deactivating the one or more devices, and incorporating the received user feedback into the assigned score for the one or more devices. For example, even though device management program 120 may determine that the television ought to be powered-off based on the three factors outlined above, a user may want the television to remain powered-on while he/she is sleeping in order to serve as a home security feature.

In exemplary embodiments, a user may provide user feedback to device management program 120 via a GUI or a pop-up window on a user's computing device, such as computing device 130, or in any other fashion known to one of ordinary skill in the art. User feedback may be stored in database 128.

In exemplary embodiments, user feedback may be overridden by device management program 120 if the potential harm of leaving an IoT device 140 on exceeds a user preference.

In exemplary embodiments, device management program 120 includes database 128. While database 128 is depicted as being stored on device management program 120, in other embodiments, database 128 may be stored on host server 110, computer device 130, or any other device or database connected via network 102, as a separate database. In alternative embodiments, database 128 may be comprised of a cluster or plurality of computing devices, working together or working separately.

In various embodiments, database 128 may be capable of storing reference charts for unique devices/appliances that include energy consumption data for particular devices/appliances, historical data for the number of accidents per year related to the unique devices/appliances, as well as confidence threshold values for the unique devices/appliances. In additional embodiments, database 128 may also store user feedback, and a history of device deactivation or power adjustment within the mesh network of a user.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, a mesh network, or a combination thereof. In general, network 102 can be any combination of connections and protocols that will support communications between host server 110, computing device 130, and IoT devices 140.

Figure 4:
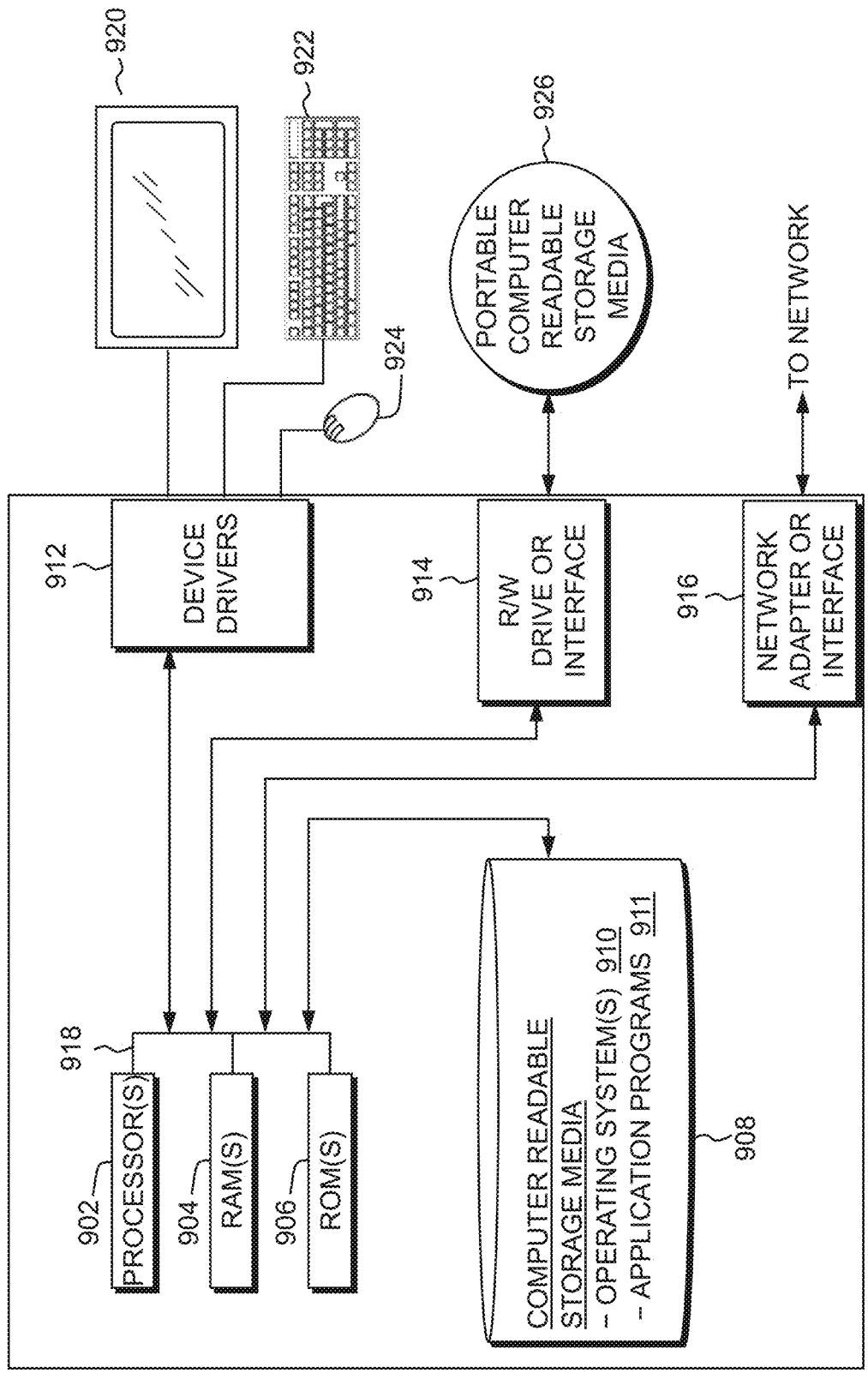
FIG. 4 is a diagram graphically illustrating the hardware components of device management computing environment of FIG. 1, in accordance with an embodiment of the present invention.

FIG. 4 is a block diagram depicting components of a computing device (such as host server 110, as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Host server 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as device management program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host server 110 may also include a R/W drive or interface 914 to read from and write to one or more portable computer readable storage media 926. Application programs 911 on host server 110 may be stored on one or more of the portable computer readable storage media 926, read via the respective R/W drive or interface 914 and loaded into the respective computer readable storage media 908.

Host server 110 may also include a network adapter or interface 916, such as a TCP/IP adapter card or wireless communication adapter (such as a 4G wireless communication adapter using OFDMA technology). Application programs 911 on host server 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host server 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
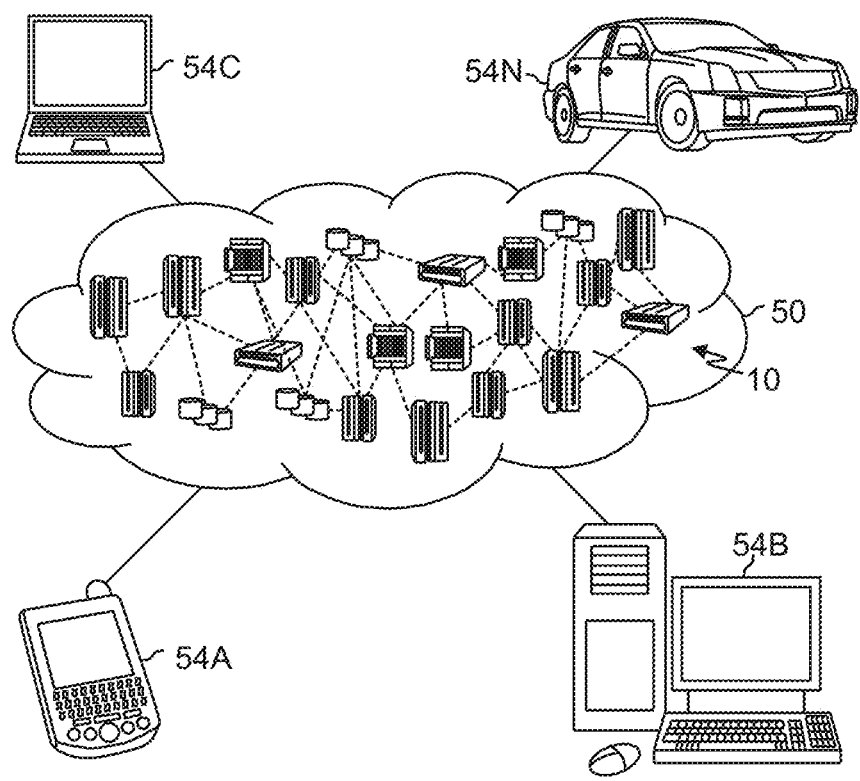
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
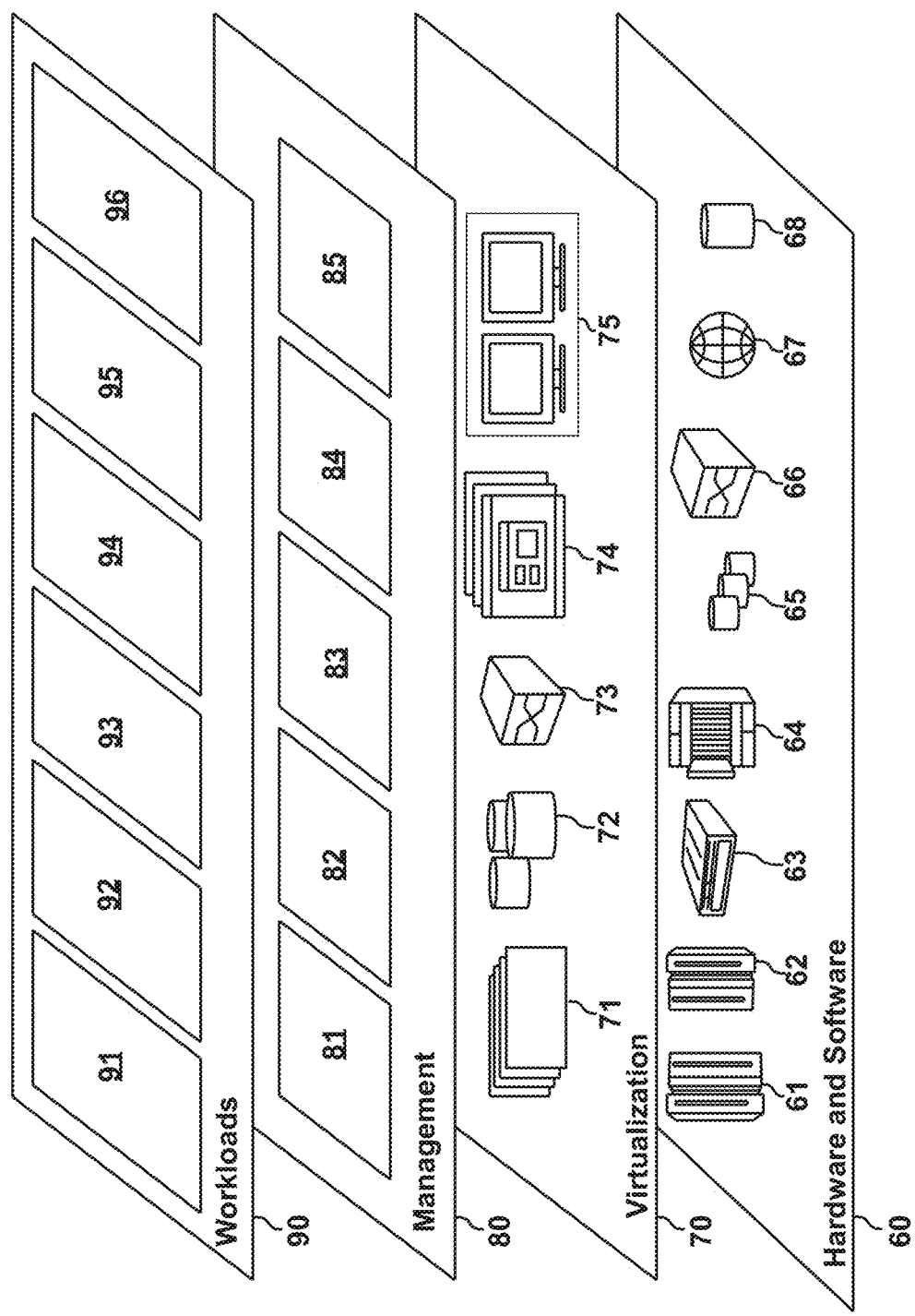
FIG. 6 depicts abstraction model layers of the illustrative cloud computing environment of FIG. 5, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling operation of one or more electronic devices 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for controlling one or more devices within a network, the method comprising:
    detecting that the one or more devices, within the network associated with a user, are in-use;
    detecting that the user is in an inactive state;
    obtaining a plurality of information associated with a plurality of factors for the detected one or more devices, within the network associated with the user, that are in-use;
    controlling the one or more devices within the network associated with the user based on the detected inactive state of the user and the obtained plurality of information associated with the plurality of factors for the detected one or more devices, within the network associated with the user, that are in-use;
    assigning a score for each of the plurality of factors for the one or more devices;
    aggregating the assigned score for each of the plurality of factors for the one or more devices; and
    deactivating the one or more devices within the network of the user based on the aggregated assigned score exceeding a threshold value.

2. The computer-implemented method of claim 1, wherein the plurality of factors comprise: an amount of time since the user last had an interaction with the one or more devices; energy consumption of the one or more devices;

potential harm caused by the one or more devices; and the amount of time that the one or more devices have been activated.

3. The computer-implemented method of claim 1, further comprising:
   ranking the one or more devices, within the network of the user, based on the aggregated assigned score; and
   prioritizing control of the one or more devices based on the ranking.

4. The computer-implemented method of claim 1, further comprising:
   receiving user feedback, in response to deactivating the one or more devices; and
   incorporating the received user feedback into the assigned score for the one or more devices.

5. The computer-implemented method of claim 1, wherein controlling the one or more devices within the network of the user comprises:
   adjusting the one or more devices within the network of the user to a lower power mode.

6. The computer-implemented method of claim 1, further comprising:
   monitoring, continuously, the one or more devices within the network of the user;
   monitoring, continuously, an activity status of the user; and
   updating, continuously, the information associated with the plurality of factors for the one or more devices within the network of the user.

7. The computer-implemented method of claim 1, further comprising:
   detecting a second user within the network; and
   controlling the one or more devices within the network based on determining that the user and the second user within the network are inactive.

8. A computer program product, comprising a non-transitory tangible storage device having program code embodied therewith, the program code executable by a processor of a computer to perform a method, the method comprising:
   detecting that the one or more devices, within the network associated with a user, are in-use;
   detecting that the user is in an inactive state;
   obtaining a plurality of information associated with a plurality of factors for the detected one or more devices, within the network associated with the user, that are in-use;
   controlling the one or more devices within the network associated with the user based on the detected inactive state of the user and the obtained plurality of information associated with the plurality of factors for the detected one or more devices, within the network associated with the user, that are in-use;
   assigning a score for each of the plurality of factors for the one or more devices;
   aggregating the assigned score for each of the plurality of factors for the one or more devices; and
   deactivating the one or more devices within the network of the user based on the aggregated assigned score exceeding a threshold value.

9. The computer program product of claim 8, wherein the plurality of factors comprise: an amount of time since the user last had an interaction with the one or more devices; energy consumption of the one or more devices; potential harm caused by the one or more devices; and the amount of time that the one or more devices have been activated.

10. The computer program product of claim 8, further comprising:
    ranking the one or more devices, within the network of the user, based on the aggregated assigned score; and
    prioritizing control of the one or more devices based on the ranking.

11. The computer program product of claim 8, further comprising:
    receiving user feedback, in response to deactivating the one or more devices; and
    incorporating the received user feedback into the assigned score for the one or more devices.

12. The computer program product of claim 8, wherein controlling the one or more devices within the network of the user comprises:
    adjusting the one or more devices within the network of the user to a lower power mode.

13. The computer program product of claim 8, further comprising:
    monitoring, continuously, the one or more devices within the network of the user;
    monitoring, continuously, an activity status of the user; and
    updating, continuously, the information associated with the plurality of factors for the one or more devices within the network of the user.

14. A computer system, comprising:
    one or more computer devices each having one or more processors and one or more tangible storage devices; and
    a program embodied on at least one of the one or more storage devices, the program having a plurality of program instructions for execution by the one or more processors, the program instructions comprising instructions for:
      detecting that the one or more devices, within the network associated with a user, are in-use;
      detecting that the user is in an inactive state;
      obtaining a plurality of information associated with a plurality of factors for the detected one or more devices, within the network associated with the user, that are in-use;
      controlling the one or more devices within the network associated with the user based on the detected inactive state of the user and the obtained plurality of information associated with the plurality of factors for the detected one or more devices, within the network associated with the user, that are in-use;
      assigning a score for each of the plurality of factors for the one or more devices;
      aggregating the assigned score for each of the plurality of factors for the one or more devices; and
      deactivating the one or more devices within the network of the user based on the aggregated assigned score exceeding a threshold value.

15. The computer system of claim 14, wherein the plurality of factors comprise: an amount of time since the user last had an interaction with the one or more devices; energy consumption of the one or more devices; potential harm caused by the one or more devices; and the amount of time that the one or more devices have been activated.

16. The computer system of claim 14, further comprising:
    ranking the one or more devices, within the network of the user, based on the aggregated assigned score; and
    prioritizing control of the one or more devices based on the ranking.

17. The computer system of claim 14, further comprising:
    receiving user feedback, in response to deactivating the one or more devices; and incorporating the received user feedback into the assigned score for the one or more devices.

\* \* \* \* \*